3,462,432
6-HYDRAZINO-PYRIDAZINE DERIVATIVES

Rudi Gall, Mannheim-Feudenheim, Erich Haack, Heidelberg, Kurt Stach, Mannheim, Wolfgang Schaumann, Mannheim-Waldhof, and Klaus Ritter, Mannheim, Germany, assignors to C. F. Boehringer & Soehne G.m.b.H., Mannheim-Waldhof, Germany, a corporation of Germany
No Drawing. Filed June 29, 1966, Ser. No. 561,335
Claims priority, application Germany, July 9, 1965, B 82,760
Int. Cl. C07d 51/04; A61k 27/00
U.S. Cl. 260—250    7 Claims

ABSTRACT OF THE DISCLOSURE

Chemotherapeutic agents characterized by blood pressure reducing activity having the formula:

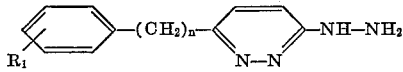

and including their non-toxic acid addition salts wherein $R_1$ is hydrogen, halogen, lower alkyl, alkoxy, alkylmercapto, halogen substituted lower alkyl, alkoxy or alkylmercapto and $n$ is 1 or 2.

---

This invention comprises novel hydrazino-pyridazine compounds and processes for making and using such compounds.

The structural formula of the new 6-hydrazino-pyridazine compounds of this invention is illustrated by the following:

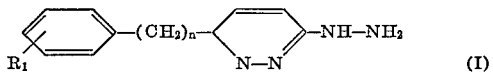

and their non-toxic acid addition salts, wherein $R_1$ is hydrogen, halogen, lower alkyl, alkoxy, alkylmercapto, halogen substituted lower alkyl, alkoxy or alkylmercapto, and $n$ is 1 or 2.

The novel 6-hydrazino-pyridazine compounds of this invention have utility as chemotherapeutic agents, particularly because of their outstanding blood pressure reducing properties.

The new compounds of this invention can be prepared by condensing, in the conventional manner, pyridazines having the formula:

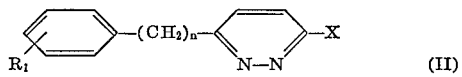

wherein $R_1$ and $n$ have the same significance as given above and X is halogen, alkoxy, aryloxy, mercapto, alkyl- or aryl-mercapto radicals, with hydrazine. The compounds thereby obtained can thereupon be converted, if desired, into their acid-addition salts.

Such salts are easily prepared by methods known to the art. The base is reacted with either the calculated amount of organic or inorganic acid in a water-miscible solvent, such as acetone or ethanol, with isolation of the salt by concentration and cooling; or with an excess of the acid in a water-immiscible solvent, such as ethyl acetate, ethyl ether or chloroform, with the desired salt separating directly. Exemplary of such organic salts are those with maleic, fumaric, benzoic, ascorbic, pamoic, succinic, bismethylenesalicylic, methylsulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-chlorotheophylline and 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well known to the art.

For carrying out the process according to the present invention, the compounds of Formula II are heated with hydrazine in a suitable inert solvent, such as an alcohol. The products obtained can then be isolated, for example, by concentration of the reaction mixture and/or by the addition of water. As indicated above, the new compounds form addition salts with inorganic and organic acids, such as the dihydrohalides.

The compounds of general Formula II used as starting materials can, where X is a halogen atom, be prepared by the method of Grundmann (Berichte, 81, 1/1948) or by the method of Overend and Wiggins (J.C.S., 1947, 239) by the reaction of the appropriate laevulinic acid with hydrazine and subsequent dehydrogenation and halogenation of the cyclization products obtained. From these halopyridazines there can then be obtained the other compounds of Formula II by exchange of the halogen atom with an alkoxy, aryloxy, mercapto, alkylmercapto or arylmercapto radical in the conventional manner.

The preparation of these compounds is fully described in the following examples. It is to be understood, however, that the examples are illustrative of the compounds embraced by this invention and of the methods for their preparation and are not to be construed as limiting the invention to the particular compounds or methods specifically described.

EXAMPLE 1

3-benzyl-6-hydrazino-pyridazine 20 g. 3-benzyl-6-chloropyridazine were boiled under reflux for 4 hours in 150 cc. isopropanol together with 49 cc. 100% hydrazine hydrate. The reaction mixture was thereafter concentrated under vacuum and the residue mixed with water. The crystals which separated out were isolated and recrystallized from water. The yield amounted to 14.3 g. 3-benzyl-6-hydrazino-pyridazine having a melting point of 111–117° C. Following recrystallization from methylene chloride-ligroin, the melting point increased to 119–123° C. On treating a solution of this compound in methanol-ether with hydrogen chloride, there was obtained a dihydrochloride having a melting point of 228–232° C. (decomp.).

The 3-benzyl-6-chloropyridazine used as starting material could be prepared in the following manner:

5-phenyl-laevulinic acid (Annalen, 268, 91/1892) was reacted with hydrazine hydrate. A quantitative cyclization took place yielding 3 - benzyl - 6 (1,4,5H)-pyridazinone having a melting point of 91–94° C. The subsequent dehydrogenation was carried out with bromine in glacial acetic acid. After recrystallization from ethyl acetate, 3-benzyl-6(1H)-pyridazinone, having a melting point of 99–103° C., was obtained in 60–70% yield. This latter compound was reacted with phosphorus oxychloride in chloroform, producing in 65% yield, 3-benzyl-6-chloropyridazine having a melting point of 90–93° C., following recrystallization from ligroin.

By treatment with sodium phenolate, the 3-benzyl-6-chloro-pyridazine was converted into 3-benzyl-6-phenoxy-pyridazine having a melting point of 103–107° C. Alternatively, by reaction with thiourea followed by alkaline splitting of the isothiuronium compound thereby obtained, 3 - benzyl - 6 - chloro-pyridazine can be converted into 3 - benzyl-6-mercapto-pyridazine having a melting point of 128–133° C. These last two mentioned compounds can be converted into 3-benzyl-6-hydrazino-pyridazine by reaction with hydrazine hydrate in a manner analogous to that described above.

EXAMPLE 2

3-(o-chlorobenzyl)-6-hydrazino-pyridazine

By the reaction of the oily 5-o-chlorophenyl-laevulinic acid with hydrazine hydrate in a manner analogous to that described in Example 1, there was obtained 3-(o-chlorobenzyl)-6(1,4,5H)-pyridazinone having a melting point of 114–118° C. The 3-(o-chlorobenzyl)-6(1,4,5H)-pyridazinone was dehydrogenated with bromine in glacial acetic acid and thereby converted into 3-(o-chlorobenzyl)-6(1H)-pyridazinone having a melting point of 128–132° C. By halogenation of this compound with phosphorus oxychloride, there was obtained 3-(o-chlorobenzyl)-6-chloropyridazine having a melting point of 64–67° C. which was thereafter reacted with hydrazine hydrate yielding 3-(o-chlorobenzyl) - 6 - hydrazino-pyridazine having a melting point of 82–91° C. The corresponding dihydrochloride had a melting point of 230° C. (decomp.).

EXAMPLE 3

3-(p-chlorobenzyl)-6-hydrazino-pyridazine

By the reaction of 5-p-chlorophenyl-laevulinic acid (M.P. 95–96.5° C.) with hydrazine hydrate in a manner analogous to that described in Example 1, there was obtained 3 - (p-chlorobenzyl) - 6(1,4,5H)-pyridazinone having a melting point of 119–123° C. On dehydrogenation with bromine in glacial acetic acid, the 3-(p-chlorobenzyl - 6(1,4,5H)-pyridazinone was converted into 3 - (p-chlorobenzyl) - 6(1H)-pyridazinone having a melting point of 136–145° C. By halogenation with phosphorus oxychloride, there was obtained 3 - (p-chlorobenzyl)-6-chloropyridazine having a melting point of 108–113° C. which was then reacted with hydrazine hydrate producing 3 - (p-chlorobenzyl) - 6 - hydrazino-pyridazine having a melting point of 155–157° C. The corresponding dihydrochloride had a melting point of 225–229° C.

EXAMPLE 4

3-(p-methyl-benzyl)-6-hydrazino-pyridazine 5-p-methyl-phenyl-laevulinic acid (M.P. 81–84° C.) was reacted with hydrazine hydrate following a procedure analogous to that described in Example 1. There was obtained 3 - (p-methyl-benzyl) - 6(1,4,5H)-pyridazinone having a melting point of 100–104° C. The 3-(p-methyl-benzyl)-6(1,4,5H)-pyridazinone was dehydrogenated with bromine in glacial acetic acid and converted into 3-(p-methyl-benzyl) - 6(1H)-pyridazinone having a melting point of 121–124° C. By halogenation with phosphorus oxychloride, there was obtained 3-(p-methyl-benzyl)-6-chloro-pyridazine having a melting point of 89–95° C. The 3 - (p-methyl-benzyl) - 6 - chloropyridazine was then reacted with hydrazine hydrate to give 3 - (p-methyl-benzyl) - 6 - hydrazino-pyridazine having a melting point of 155–157° C. The corresponding dihydrochloride had a melting point of 241° C. (decomp.).

EXAMPLE 5

3-β-phenethyl-6-hydrazino-pyridazine 1 mol 3-β-phenethyl-6-chloropyridazine in isopropanol was heated for 4 hours with 10 mol hydrazine hydrate. The reaction mixture was then concentrated using vacuum, the residue washed with ice water and, after drying, recrystallized from methylene chloride-ligroin. There was thereby obtained 3-β-phenethyl-6-hydrazino-pyridazine in a yield of 51% of theory having a melting point of 134–138° C. The corresponding dihydrochloride, obtained in the conventional way, melted at 215–218° C. following recrystallization from methanol-ether.

The 3-β-phenethyl-6-chloropyridazine used as starting material was prepared in the following manner:

Benzal-laevulinic acid (Berichte, 23, 74/1890) was cyclized with hydrazine hydrate yielding 3-β-styryl-6(1,4,5H)-pyridazinone, having a melting point of 164–167° C., in a 53% yield. By hydrogenation of this compound in the presence of a palladium catalyst, there was obtained, in 96% yield, 3-β-phenethyl-6(1,4,5H)-pyridazinone having a melting point of 118–122° C. The 3-β-phenethyl-6 (1,4,5H)-pyridazinone was then dehydrogenated with bromine in glacial acetic acid, whereupon 3-β-phenethyl-6 (1H)-pyridazinone having a melting point of 111–114° C., following recrystallization from ethyl acetate was attained in 71% yield. By the reaction of this compound with phosphorus oxychloride in chloroform, there was obtained, in 78% yield, 3-β-phenethyl-6-chloropyridazine which was extracted with ligroin and melted at 77–80° C.

A large number of chemotherapeutic agents are known which reduce blood pressure in patients having hypertension. These compounds, however, do not demonstrate this activity under normotensive conditions or alternatively the toxicity of the compounds does not permit their use regardless of their effect on blood pressure.

Experimental work carried out with the compounds of the instant invention indicates that these compounds exhibit blood pressure lowering activity in both the hypertensive and normotensive and that this activity does not depend upon diuresis, ganglionic blockade, or adrenergic blockade, but rather directly affects that part of the vascular system which is deranged in hypertension, i.e., the peripheral vasculature. As such, the compounds of the invention are useful as valuable therapeutic agents for the alleviation and control of essential hypertension, malignant hypertension, and the like, and peripheral vascular disorder, e.g., Buerger's disease, Raynaud's disease, and the like.

The activity of the compounds of the invention was evaluated by various well-known pharmacological procedures.

The following compounds of the invention and two known compounds (comparison) were employed in the studies:

(A) Nepresol - dihydralazine (1,4 - dihydrazino - phthalazine) Ciba
(B) 3 - phenyl - 6 - hydrazino - pyridazine (U.S. Patent 2,484,029)
(C) 3-benzyl-6-hydrazino-pyridazine
(D) 3-(p-chlor-benzyl)-6-hydrazino-pyridazine
(E) 3-(o-chlor-benzyl)-6-hydrazino-pyridazine
(F) 3-(p-methyl-benzyl)-6-hydrazino-pyridazine
(G) 3-β-phenethyl-6-hydrazino-pyridazine I.—Influence on blood pressure of hypertensive rats In order to ascertain the anti-hypertensive activity in hypertensive rats, rats were prepared by repeated (several weeks) injections of desoxycorticosterone acetate plus maintenance on saline. The blood pressure was measured at the animal's tail after the animal had been warmed and very slightly narcotized with ether according to the technique described by Breuninger (Naunyn-Schmiedeberg's Arch. exp. Path. u. Pharmak. 225, 190, 1955). The measurements were made following compression with a rubber cuff, the pulse signs being obtained by means of a condenser microphone according to Boucke-Brecht (see supra). The data and results of these studies are shown in the following table:

TABLE I.—ANTI-HYPERTENSIVE ACTIVITY, EFFECT ON THE BLOOD PRESSURE OF HYPERTENSIVE RATS

| Compound | No. of animals | Mg./kg. oral (ml.) | Control value | Blood pressure 2 hrs. | Difference | No. of animals | Mg./kg. oral (ml.) | Control value | Blood pressure 2 hrs. | Difference | 4 hrs. | Difference |
|---|---|---|---|---|---|---|---|---|---|---|---|---|
| Control | 10 | 50 | 177 | 178 | +1 | 20 | 50 | 162 | 159 | −3 | | |
| C | 10 | 0.25 | 181 | 167 | −14 | 20 | 0.5 | 165 | 137 | −28 | | |
| A | 10 | 0.25 | 180 | 182 | +2 | 20 | 0.5 | 160 | 143 | −17 | | |
| B | 10 | 0.25 | 182 | 177 | −5 | 20 | 0.5 | 164 | 145 | −19 | | |
| Control | | | | | | 10 | 50 | 180 | 182 | +2 | 184 | +4 |
| C | | | | | | 10 | 0.5 | 181 | 119 | −62 | 120 | −61 |
| D | | | | | | 10 | 0.5 | 180 | 138 | −42 | 139 | −41 |
| E | | | | | | 10 | 0.5 | 180 | 127 | −53 | 122 | −58 |

Oral administration of 0.25 mg./kg. 3-benzyl-6-hydrazino-pyridazine produced significant hypotensive effects, the same being more marked than that obtained with a similar dose of dihydralazine or 3-phenyl-6-hydrazino-pyridazine. When the dosage was increased to 0.5 mg./kg., an anti-hypertensive effect was observed for the comparison compounds but also at this level the 3-benzyl-6-hydrazino-pyridazine was more effective. From the results of Table I it can be concluded that the pressure decreasing threshold dose for 3-benzyl-6-hydrazino-pyridazine is 0.25 mg./kg. and that of dihydralazine and 3-phenyl-6-hydrazino-pyridazine at 0.5 mg./kg.

A comparison of the decrease in pressure observed following administration of 3-(p-chlor-benzyl)-6-hydrazino-pyridazine and 3 (o-chlor-benzyl)-6-hydrazino-pyridazine with that observed for 3-benzyl-6-hydrazino-pyridazine compels the conclusion that both of these substances also have a threshold dose value of 0.25 mg./kg.

II.—Influence on blood pressure of the normotensive rat

The blood pressure of rats was measured with the rats under urethane narcosis, the average arterial pressure being measured in the *A. carotis* using therefor a conventional mercury manometer. The results of these studies are set out in Table II which follows:

TABLE II.—INFLUENCE ON THE BLOOD PRESSURE OF NORMOTENSIVE RATS

| No. of animals | Compound | Mg./kg. I.V. ml. | Control value | Blood pressure Post injection 30 min. |
|---|---|---|---|---|
| 7 | Control | 1 | 85 | 79 |
| 5 | C | 0.025 | 83 | 58 |
| 5 | C | 0.1 | 82 | 45 |
| 4 | C | 0.25 | 115 | 56 |
| 5 | C | 0.5 | 95 | 50 |
| 5 | A | 0.5 | 92 | 73 |
| 5 | B | 0.025 | 79 | 67 |
| 6 | B | 0.1 | 80 | 57 |
| 4 | B | 0.25 | 88 | 51 |
| 6 | B | 0.5 | 89 | 49 |
| 5 | D | 0.5 | 97 | 60 |
| 5 | E | 0.5 | 92 | 46 |
| 5 | F | 0.5 | 79 | 57 |
| 6 | G | 0.5 | 107 | 63 |

It is known from pharmacological reports that in the normotensive rat, a decrease in the average arterial pressure down to about 50 mm. (maximal) may be achieved. As in the normotensive animal there is a wide variation in the starting values, a fair evaluation can only be made by considering not the absolute differences but the value reached following drug administration.

From the Table II it can be seen that following administration of 0.025 mg./kg. 3-benzyl-6-hydrazino-pyridazine approximately the maximal reduction is achieved, while substantially no reduction is observed following administration of 0.5 mg./kg. of dihydralazine. The effect observed with 0.025 mg./kg. 3-benzyl-6-hydrazino-pyridazine is registered only with four-fold the dose, i.e., 0.1 mg. of 3-phenyl-6-hydrazino-pyridazine. The maximal pressure decrease was observed following administration of 0.5 mg./kg. of 3-(p-chlor-benxyl)-6-hydrazino-pyridazine, 3-o-chlor-benzyl - 6 - hydrazino - pyridazine, 3-(p-methyl-benzyl)-6-hydrazino-pyridazine and 3-β-phenethyl-6-hydrazino-pyridazine.

III.—Effect on vascular resistance—Rabbits

A constant volume of blood taken from the *A. carotis* was perfused with a pump to the *A. iliac*. The test compounds to be evaluated were injected into the perfusion system prior to the pump and the perfusion pressure which was measured just behind the pump served as a measure of the vascular resistance.

Just prior to the test, the maximum blood vessel dilation was determined by injection of increasing amounts of adenosine. Thereafter, 100, 100 and 200γ of test compound were administered successively. Each successive injection was carried out when the effect of the previous injection had reached the maximum value as all of the substances tested dilated the blood vessels irreversibly. The evaluation was carried out by setting the pressure difference according to the maximally effective adenosine dose=100% (K). Based on this maximal pressure difference following adenosine and from the absolute values (I) of blood pressure decrease caused by the single doses of test substances, the percentage was evaluated showing the ratio of the effect of the test compound to the maximal adenosine effect. The results are set out in Table III which follows:

TABLE III.—INFLUENCE ON VASCULAR RESISTANCE, RABBITS

| No. of animals | Compound | Maximum decrease after adenosine =100% K | Perfusion pressure decrease after— | | | | | | | |
|---|---|---|---|---|---|---|---|---|---|---|
| | | | 100γ | | 100γ | | 200γ | | 500γ | |
| | | | Abs. I | Percent I.100 K | Abs. I | Percent I.100 K | Abs. I | Percent I.100 K | Abs. I | Percent I.100 K |
| 5 | C | 61 | 32 | 52 | 43 | 71 | 45 | 74 | | |
| 6 | A | 43 | −1 | −2 | −1 | −2 | −1 | −2 | 0 | ±0 |
| 4 | B | 61 | 13 | 21 | 33 | 54 | 43 | 71 | | |
| 2 | D | 54 | 17 | 32 | 37 | 69 | 45 | 83 | | |

The table establishes that dihydralazine was ineffective up to a total dose of 900γ. Contrastedly, 3-benzyl-6-hydrazino-pyridazine decreased the blood vessel resistance clearly and continuously and, namely, after 100γ by about 50%. 3-phenyl-6-hydrazino-pyridazine was less effective, the dilatation following 100γ amounting only to 20% of the maximal adenosine effect. The results for 3-(p-chlor-benzyl)-6-hydrazino-pyridazine at all dose levels was more effective than 3-phenyl-6-hydrazino-pyridazine.

The effective doseage of the compounds of this invention depends upon the severity, the stage, and the individual characteristics of each case and in clinical practice will be determined by an attending physician. The animal experiments indicate that the compounds of this invention are 5–10 times more active than dihydralazine, which is marketed in tablets of 25 mg. Accordingly, tablets should contain 5 mg. of the new compounds, the number of tablets depending on the severity of the disease (generally, from 1–10 tablets per day).

We claim:
1. 6-hydrazino-pyridazine compounds selected from the class consisting of compounds having the structural formula

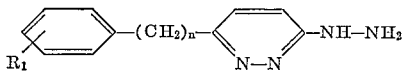

and their non-toxic acid addition salts wherein $R_1$ is selected from the group consisting of hydrogen, and $n$ is 1 or 2.
2. 3-benzyl-6-hydrazino-pyridazine.
3. 3-(o-chlorobenzyl)-6-hydrazino-pyridazine.
4. 3-(p-chlorobenzyl)-6-hydrazino-pyridazine.
5. 3-(p-methyl-benzyl)-6-hydrazino-pyridazine.
6. 3-β-phenethyl-6-hydrazino-pyridazine.
7. 6-hydrazino-pyridazine compound according to claim 1 in the form of its salt with hydrochloric acid.

References Cited

UNITED STATES PATENTS 2,484,029   10/1949   Hartmann et al.

NICHOLAS S. RIZZO, Primary Examiner

U.S. Cl. X.R.
424—250

UNITED STATES PATENT OFFICE
CERTIFICATE OF CORRECTION

Patent No. 3,462,432                         August 19, 1969

Rudi Gall et al.

It is certified that error appears in the above identified patent and that said Letters Patent are hereby corrected as shown below:

Column 1, line 37, the formula should appear as shown below

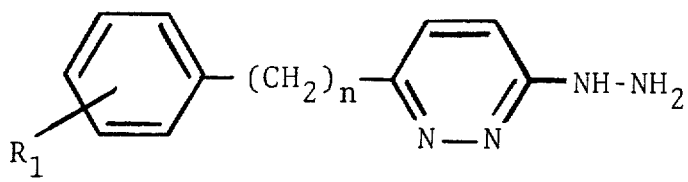

Column 5, Table II, under the first heading, item 13, "5" should read -- 6 --, and item 14, "6" should read -- 5 --. Column 6, line 24, "(p-chlor-benxyl)" should read -- (p-chlor-benzyl) --. Column 8, line 2, after "hydrogen" insert -- chlorine and methyl, --.

Signed and sealed this 2nd day of June 1970.

(SEAL)
Attest:

EDWARD M. FLETCHER, JR.                  WILLIAM E. SCHUYLER, JR.
Attesting Officer                            Commissioner of Patents